United States Patent [19]
Khadder et al.

[11] Patent Number: 6,094,713
[45] Date of Patent: Jul. 25, 2000

[54] METHOD AND APPARATUS FOR DETECTING ADDRESS RANGE OVERLAPS

[75] Inventors: Ghassan Khadder, San Jose; Josef R. Call; Michael J. Morrison, both of Santa Clara, all of Calif.

[73] Assignee: Intel Corporation, Santa Clara, Calif.

[21] Appl. No.: 08/940,167

[22] Filed: Sep. 30, 1997

[51] Int. Cl.[7] .................................................. G06F 12/00
[52] U.S. Cl. ............................................ 711/210; 711/220
[58] Field of Search .................................... 711/210, 201, 711/220; 712/216

[56] References Cited

U.S. PATENT DOCUMENTS

| | | | |
|---|---|---|---|
| 5,241,633 | 8/1993 | Nishi | 712/216 |
| 5,287,498 | 2/1994 | Perelman et al. | 711/202 |
| 5,548,795 | 8/1996 | Au | 711/4 |
| 5,848,256 | 12/1998 | Call et al. | 712/216 |

*Primary Examiner*—Glenn Gossage
*Attorney, Agent, or Firm*—Blakely, Sokoloff, Taylor & Zafman LLP

[57] ABSTRACT

A method and apparatus for detecting address range overlaps. According to one embodiment, a first mask is generated for a first address range and a second mask is generated for a second address range. A first AND operation is performed on the first address range and the second mask to output a first temporary value. A second AND operation is performed on the second address range and the first mask to output a second temporary value. The first temporary value is then compared to the second temporary value to detect an overlap between the first address range and the second address range. According to an alternate embodiment, a first mask is generated for a first address range and a second mask is generated for a second address range. The first mask is then compared to the second mask to detect an overlap between the first address range and the second address range.

25 Claims, 5 Drawing Sheets

METHOD AND APPARATUS FOR DETECTING ADDRESS RANGE OVERLAPS

FIELD OF THE INVENTION

The present invention relates to the field of computer systems. More specifically, the present invention relates to a method and apparatus for detecting address range overlaps.

BACKGROUND OF THE INVENTION

Modern microprocessors utilize various techniques to improve data processing efficiency. A number of these techniques may give rise to problems of detecting numerical overlaps such as address range overlaps. "Advance loading" is an example of one such technique. An advance load allows load instructions to be scheduled ahead of undisambiguated store instructions, thus reducing data cache misses and indirectly improving data processing efficiency. Advance loading functionality may be implemented in a number of ways. In the following description, advance loading takes advantage of an address table, referred to herein as an "advanced load address table" (ALAT).

The mechanism of the ALAT is as follows: When a load instruction is moved, for example by the compiler, ahead of an undisambiguated store instruction, the load instruction is converted into an advance load instruction. A check instruction is then placed at the original location of the load instruction. An advance load instruction enters its address range and its destination register physical identifier into the ALAT. Meanwhile the ALAT snoops the physical address of every store instruction and invalidates all ALAT entries having an overlapping address range. The ALAT performs the snoop by comparing the address range of every store instruction it processes with every advance load instruction stored in the table.

The check instruction queries the ALAT to determine whether the advance load address was partially or completely overwritten by the store instruction by matching its own destination register physical identifier with all those still valid in the table. If a match is found, the ALAT mechanism recognizes that the snoop did not invalidate the advance load address. The advance load address is therefore still valid and the processor may continue processing. If a match is not found, however, due to either an overlapping store invalidate or table overflow, the ALAT mechanism recognizes that the advance load is no longer valid and the data will have to be reloaded. If the advance load data has already been consumed, the check instruction fails and the ALAT will raise an exception to invoke recovery code.

The advance load technique thus gives rise to the need to detect address range overlaps between advance loads and stores. For example, if there is an advance load of 4 bytes from address 'h0 ('h0–'h3), and then a store of 1 byte into 'h2, the initial advance load should be reexecuted because the 1 byte of data stored in 'h2 will have replaced parts of the original advance loaded data. In order to address this issue, the ALAT records the address and the data size of each advance load and uses this information to compare the advance load and store addresses against each other to detect any true overlap.

This address range comparison may be performed by hardware components. To do so, however, the current microprocessor hardware architecture must be extended with numerous comparator circuits. This type of burden on the hardware is extremely costly, and as such, an alternative method of detecting address range overlaps is desirable.

SUMMARY OF THE INVENTION

The present invention discloses a method and apparatus for detecting address range overlaps. According to one embodiment of the present invention, a first mask is generated for a first address range and a second mask is generated for a second address range. A first AND operation is performed on the first address range and the second mask to output a first temporary value. A second AND operation is performed on the second address range and the first mask to output a second temporary value. The first temporary value is then compared to the second temporary value to detect an overlap between the first address range and the second address range.

According to an alternate embodiment of the present invention, a first mask is generated for a first address range and a second mask is generated for a second address range. The first mask is then compared to the second mask to detect an overlap between the first address range and the second address range.

Other features and advantages of the present invention will be apparent from the accompanying drawings and from the detailed description.

BRIEF DESCRIPTION OF THE DRAWINGS

The present invention is illustrated by way of example and not by way of limitation in the figures of the accompanying drawings in which like reference numerals refer to similar elements and in which.

DETAILED DESCRIPTION OF THE PREFERRED EMBODIMENT

A method and apparatus for detecting address range overlaps is described. Although the description uses an advance load to illustrate the problem with address overlaps, the following embodiments of the present invention may also be practiced under other circumstances giving rise to address range overlaps. Additionally, although the following assumes an address range overlap, the techniques described may be used to detect the overlap of any numerical range.

In the following detailed description, numerous specific details are set forth in order to provide a thorough understanding of the present invention. It will be apparent to one of ordinary skill in the art, however, that these specific details need not be used to practice the present invention. In other instances, well-known structures, interfaces and processes have not been shown in detail in order not to unnecessarily obscure the present invention.

Figure 1:
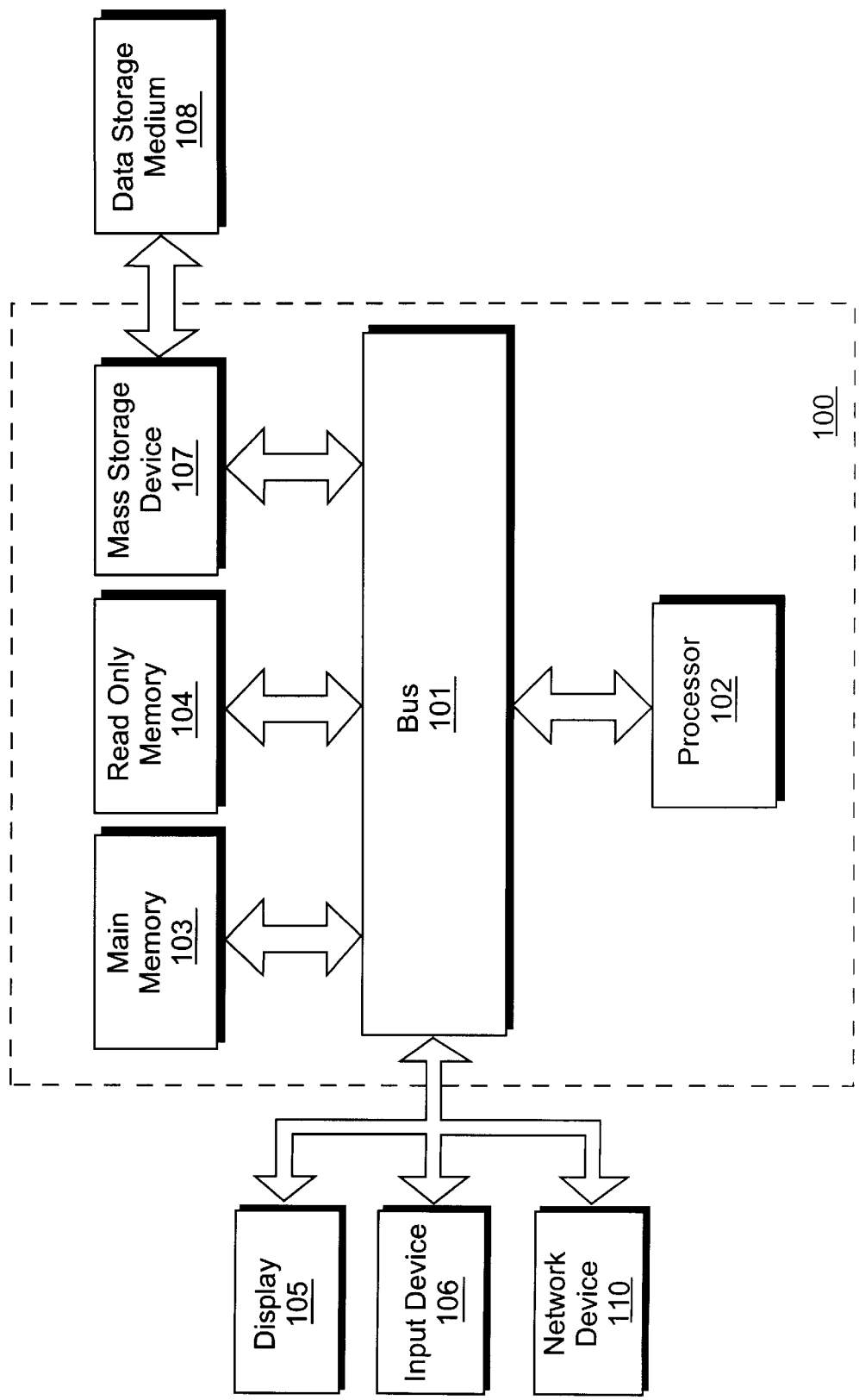
FIG. 1 illustrates a computer system of the present invention.

FIG. 1 illustrates a typical computer system 100 in which the present invention operates. One embodiment of the present invention is implemented on a computer system employing a personal computer architecture. It will be apparent to those of ordinary skill in the art that other alternative computer system architectures may also be employed.

In general, such computer systems as illustrated by FIG. 1 comprise a bus 101 for communicating information, a processor 102 coupled with the bus 101 for processing information, main memory 103 coupled with the bus 101 for storing information and instructions for the processor 102, a read-only memory 104 coupled with the bus 101 for storing static information and instructions for the processor 102, a display device 105 coupled with the bus 101 for displaying information for a computer user, an input device 106 coupled with the bus 101 for communicating information and command selections to the processor 102, and a mass storage device 107 coupled with the bus 101 for storing information and instructions. Bus 101 may include a hierarchy of interconnected buses. A data storage medium 108, such as a magnetic disk and associated disk drive, containing digital information is configured to operate with mass storage device 107 to allow processor 102 access to the digital information on data storage medium 108 via bus 101.

Processor 102 may be any of a wide variety of general purpose processors or microprocessors such as the Pentium® brand processor manufactured by Intel® Corporation of Santa Clara, Calif. It will be apparent to those of ordinary skill in the art, however, that other varieties of processors may also be used in a particular computer system. Display device 105 may be a liquid crystal device, cathode ray tube (CRT), or other suitable display device. Mass storage device 107 may be a conventional hard disk drive, floppy disk drive, compact disc-read-only memory (CD-ROM) drive, or other magnetic or optical data storage device for reading and writing information stored on a hard disk, a floppy disk, a CD-ROM, a magnetic tape, or other magnetic or optical data storage medium. Data storage medium 108 may be a hard disk, a floppy disk, a CD-ROM, a magnetic tape, or other magnetic or optical data storage medium.

In general, processor 102 retrieves processing instructions and data from a data storage medium 108 using mass storage device 107 and downloads this information into random access main memory 103 for execution. Processor 102, then executes an instruction stream from random access main memory 103 or read-only memory 104. Command selections and information input at input device 106 are used to direct the flow of instructions executed by processor 102. Input device 106 may also be a pointing device such as a conventional mouse or trackball device. The results of this processing execution are then displayed on display device 105.

Computer system 100 includes a network device 110 for connecting computer system 100 to a network. The network device 110 for connecting computer system 100 to the network includes Ethernet™ devices, data modems and Integrated Services Digital Network (ISDN) adapters. It will be apparent to one of ordinary skill in the art that other network devices may also be utilized.

According to one embodiment of the present invention, to detect an overlap between two address ranges, both addresses are assumed to be aligned. The word "aligned" implies the following:

TABLE 1

| | |
|---|---|
| 1 byte range: | No restrictions |
| 2 byte range: | Bit 0 of the address should be 0 |
| 3 to 4 byte range: | Bits 0 and 1 of the address should be 0 |
| 5 to 8 byte range: | Bits 0, 1 and 2 of the address should be 0 |
| 9 to 16 byte range: | Bits 0, 1, 2, and 3 of the address should be 0 |
| 17 to 32 byte range: | Bits 0, 1, 2, 3, and 4 of the address should be 0 |
| 33 to 64 byte range: | Bits 0, 1, 2, 3, 4 and 5 of the address should be 0 |

Given aligned addresses and assuming the address ranges do not exceed 64 bytes, a 6-bit mask will be generated for each address according to the following table:

TABLE 2

| | |
|---|---|
| 1 byte range: | '111111 |
| 2 byte range: | '111110 |
| 3 to 4 byte range: | '111100 |
| 5 to 8 byte range: | '111000 |
| 9 to 16 byte range: | '110000 |
| 17 to 32 byte range: | '100000 |
| 33 to 64 byte range: | '000000 |

Figure 2:
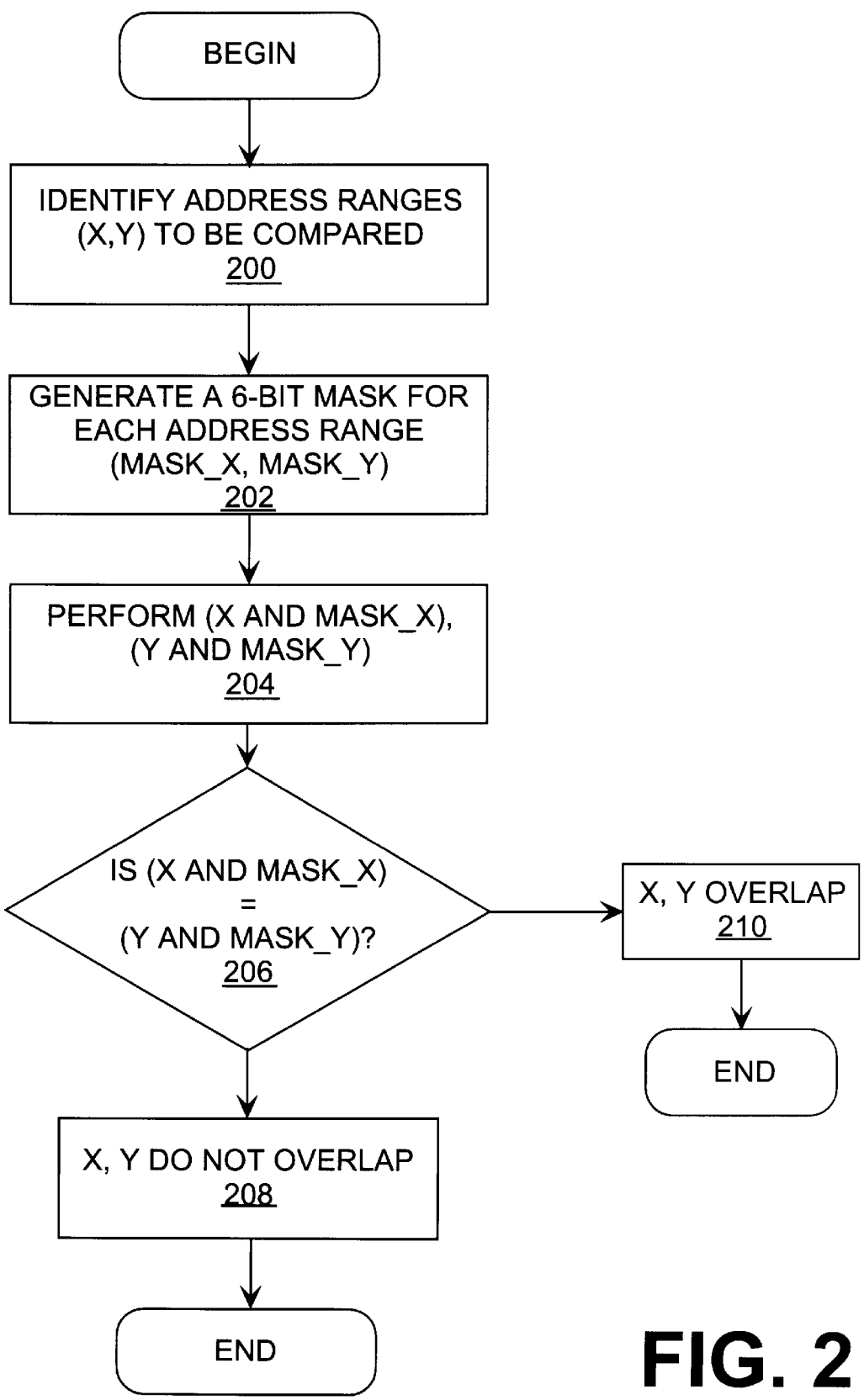
FIG. 2 is a flowchart illustrating one embodiment of the address range overlap detecting method of the present invention.

According to one embodiment of the present invention, to detect an address overlap between aligned address ranges X and Y, the following logical equation is applied to the address ranges:

IF (address_X AND mask_Y)==(address_Y AND mask_X) THEN overlap=TRUE
ELSE
overlap=FALSE FIG. 2 is a flow chart illustrating a method for detecting an overlap between first and second address ranges according to one embodiment of the present invention. At step 200, two address ranges, X and Y are identified to be compared according to this embodiment. In step 202, a 6-bit mask based on Table 2 is generated for each address range, resulting in mask_X for address range X and mask_Y for address range Y. At step 204, two AND operations are performed, specifically (X AND mask_X) and (Y AND mask_Y). In step 206, the output of the first AND operation and the output of the second AND operation are compared against each other to determine whether they match. If the outputs do not match, then at step 208 address ranges X and Y are determined to be not overlapping. If the outputs of the AND operations do match, however, then at step 210, the address ranges X and Y are deemed to overlap.

The following is an example of the embodiment described above:

Address X 0x1234='0001001000110100 with range of 4-bytes
Address Y 0x1230='0001001000110000 with range of 8-bytes Based on Table 2, the mask for address X is '111100 and the mask for address Y is '111000. Thus, applying the logical equation above to address ranges X and Y:

(address_X and mask_Y)=('0001001000110100 AND 111000)='0001001000110000
(address_Y AND mask_X)=('0001001000110000 AND 111100)='0001001000110000
'0001001000110000=='0001001000110000
Overlap=TRUE In the above example therefore, based on the logical equation of this embodiment, address ranges X and Y are determined to overlap. This embodiment is ideally suited to aligned address ranges, as described above. In order to utilize the above embodiment with misaligned address ranges, the address ranges must first be converted to aligned address ranges. To perform the conversion, the smallest aligned address range is identified which encompasses the misaligned address range. For example, misaligned address range 10110001 (2 byte range) is converted to 10110000 (4 byte address range). Thus, according to the above embodiment, in the event the address ranges are misaligned, the logical equation of this embodiment may result in a large error rate manifested as incorrect "Overlap=TRUE" indications.

As such, an alternative embodiment of the present invention may be utilized for both aligned and misaligned address ranges. The following example assumes address ranges of 64-bytes, although this embodiment is also applicable to other address ranges, with slight modifications.

A mask is generated for every advance load and store instruction. For addresses X and Y, the lower 6 bits of each address along with the operand size is used to generate the address mask. The address mask consists of 16 bits, 8 bits corresponding to the 8 octants of the 64-byte line enclosing the address range ("octant mask"), and the remaining 8 bits corresponding to each byte in an octant ("byte mask"). Whenever an address range touches an octant, the corresponding octant bit is set to 0. Similarly, wherever an address range touches a byte in an octant, the corresponding byte of the temporary byte mask is set to 0. The final byte mask is the ANDing logical operation of all the temporary byte masks. Finally, the following Boolean equation is used in order to detect whether the address ranges overlap:

((octant mask_X [7:0] NOR octant mask_Y [7:0]) !='00000000) AND (byte mask_X [7:0] NOR byte mask_Y [7:0] !='0000000) and all other bits, excluding the lowest 6 bits, match for both addresses.

If the above is true, namely the AND results in !='00000000, then the address ranges are determined to be non-overlapping. Sometimes the generated mask defines a wider superset range of the true range for certain addresses and operand sizes, hence, false overlaps might be flagged. This is also true for the first embodiment of the present invention, described above.

Figure 3A:
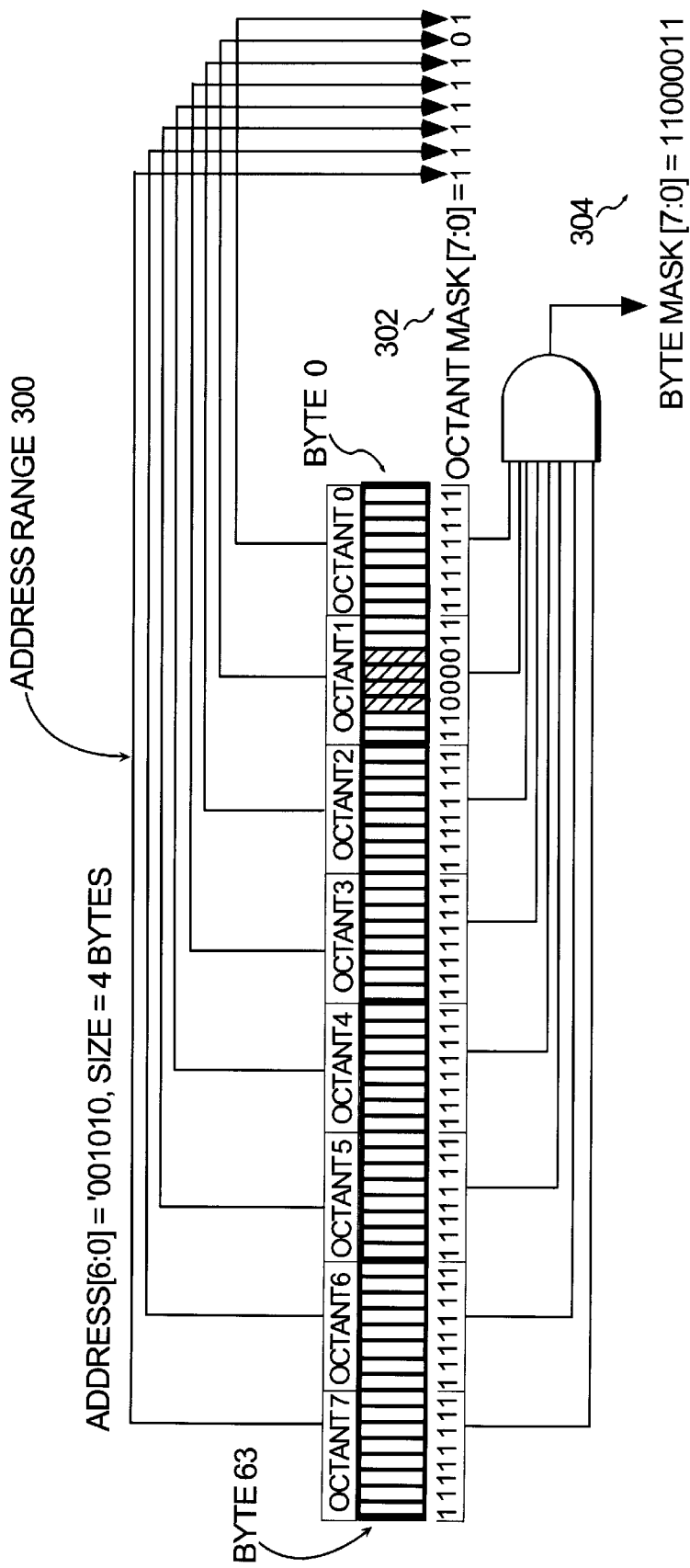
FIGS. 3A and 3B illustrates one example according to an embodiment of the present invention.
Figure 3B:
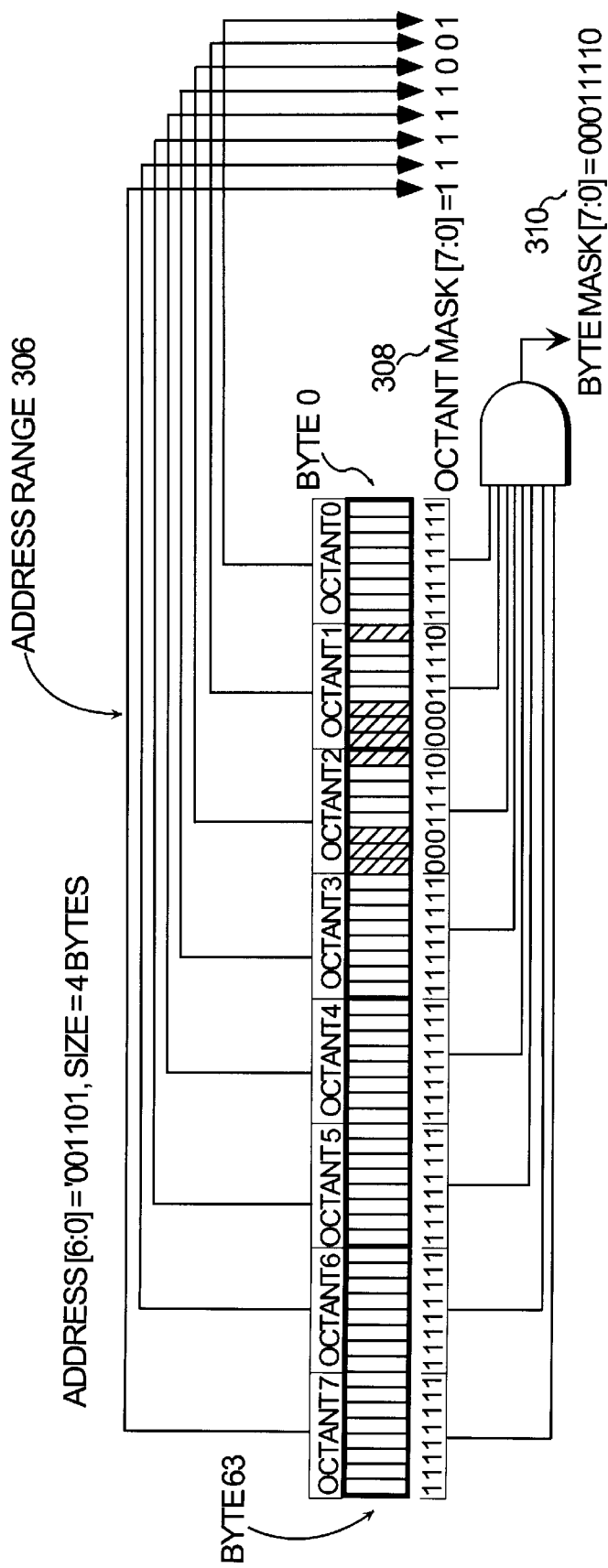

FIGS. 3A and B illustrate an example according to this alternate embodiment of the present invention. According to FIG. 3A, a mask is generated for address range 300. Octant mask 302 and byte mask 304 are generated for address range 300 according to the method described above, namely the 8 bits corresponding to the 8 octants of the 64-byte line enclosing the address range are the octant mask and the remaining bits corresponding to each byte in the octant are the byte mask. Similarly, in FIG. 3B, octant mask 308 and byte mask 310 are generated for address range 306. At this point, applying the Boolean equation above, address range 300 and address range 306 are deemed to be overlapping address ranges.

Figure 4:
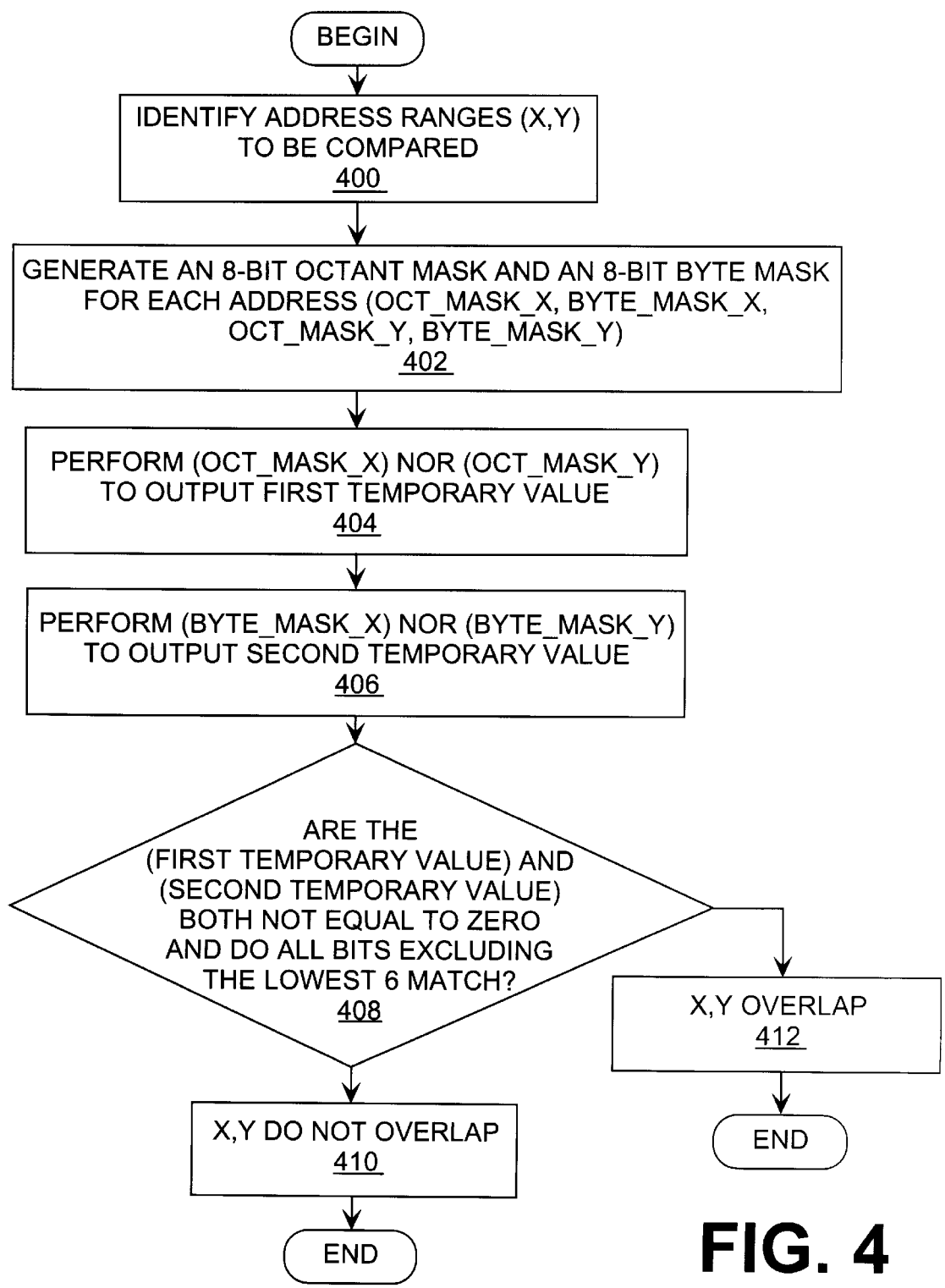
FIG. 4 is a flowchart illustrating a method for detecting an overlap between first and second address ranges in accordance with one embodiment of the present invention.

FIG. 4 is a flowchart illustrating a method for detecting an overlap between first and second address ranges in accordance with one embodiment of the present invention. In step 400, address ranges X and Y are identified to be compared against each other. In step 402, an 8-bit octant mask and an 8-bit byte mask are generated for each address X and Y, resulting in oct_mask_X, byte_mask_X, oct_mask_Y and byte_mask_Y. In step 404, a NOR operation is performed for (oct_mask_X) and (oct_mask_Y) to output a first temporary value. In step 406, a NOR is performed for (byte_mask_X) and (byte_mask_Y) to output a second temporary value. In step 408, the first temporary value and the second temporary value are examined to determine whether they each output a zero value and whether all bits of the output excluding the lowest 6 bits match. If the output of both operations is not zero and all the bits excluding the lowest 6 bits match, then in step 412, address range X and Y are deemed to overlap. Otherwise, the address ranges are deemed to not overlap, as indicated in step 410.

Thus, a method and apparatus for detecting address range overlaps is disclosed. The specific arrangements and methods described herein are merely illustrative of the principles of the present invention. Numerous modifications in form and detail may be made by those of ordinary skill in the art without departing from the scope of the invention. Although this invention has been shown in relation to a particular preferred embodiment, it should not be considered so limited. Rather, the present invention is limited only by the scope of the appended claims.

What is claimed is:

1. A method for detecting an overlap between a first address range and a second address range, said method comprising the steps of:

generating a first mask for said first address range;

generating a second mask for said second address range;

performing a first AND operation on said first address range and said second mask to output a first temporary value;

performing a second AND operation on said second address range and said first mask to output a second temporary value; and comparing said first temporary value to said second temporary value to detect said overlap between said first address range and said second address range.

2. The method according to claim 1 wherein said step of generating said first mask includes the step of applying a first predetermined value for said first mask based on said first address range.

3. The method according to claim 1 wherein said step of generating said second mask includes the step of applying a second predetermined value for said second mask based on said second address range.

4. The method according to claim 1 wherein said first address range and said second address range are aligned.

5. The method according to claim 1 wherein said first mask is a 6 bit mask.

6. The method according to claim 1 wherein said second mask is a 6 bit mask.

7. A method for detecting an overlap between a first address range and a second address range, said method comprising the steps of:

generating a first mask for said first address range;

generating a second mask for said second address range; and comparing said first mask to said second mask to detect said overlap between said first address range and said second address range.

8. The method according to claim 7 wherein said step of generating said first mask includes the steps of:

generating a first octant mask; and generating a first byte mask.

9. The method according to claim 7 wherein said step of generating said second mask includes the steps of:

generating a second octant mask; and generating a second byte mask.

10. The method according to claim 8 wherein said first mask comprises said first octant mask and said first byte mask.

11. The method according to claim 10 wherein said second mask comprises said second octant mask and said second byte mask.

12. The method according to claim 11 wherein said step of comparing said first mask to said second mask includes the steps of:

performing a first NOR operation on said first octant mask and said second octant mask to output a first temporary value;

performing a second NOR operation on said first byte mask and said second byte mask to output a second temporary value;

performing an AND operation on said first temporary value and said second temporary value; and determining said first address range and said second address range are overlapping if said AND operation returns a true value.

13. The method according to claim 8 wherein said first octant mask is an 8 bit mask.

14. The method according to claim 8 wherein said first byte mask is an 8 bit mask.

15. The method according to claim 9 wherein said second octant mask is an 8 bit mask.

16. The method according to claim 9 wherein said second byte mask is a 8 bit mask.

17. A machine readable medium having stored thereon data representing sequences of instructions, which when executed by a computer system, cause said computer system to perform the steps of:

generating a first mask for a first address range;

generating a second mask for a second address range;

performing a first AND operation on said first address range and said second mask to output a first temporary value;

performing a second AND operation on said second address range and said first mask to output a second temporary value; and comparing said first temporary value to said second temporary value to detect an overlap between said first address range and said second address range.

18. The machine readable medium according to claim 17 wherein said step of generating said first mask includes the step of applying a first predetermined value for said first mask based on said first address range.

19. The machine readable medium according to claim 17 wherein said step of generating said second mask includes the step of applying a second predetermined value for said second mask based on said second address range.

20. A machine readable medium having stored thereon data representing sequences of instructions, which when executed by a computer system, cause said computer system to perform the steps of:

generating a first mask for a first address range;

generating a second mask for a second address range; and comparing said first mask to said second mask to detect an overlap between said first address range and said second address range.

21. The machine readable medium according to claim 20 wherein said step of generating said first mask includes the steps of:

generating a first octant mask; and generating a first byte mask.

22. The machine readable medium according to claim 20 wherein said step of generating said second mask includes the steps of:

generating a second octant mask; and generating a second byte mask.

23. The machine readable medium according to claim 21 wherein said first mask comprises said first octant mask and said first byte mask.

24. The machine readable medium according to claim 23 wherein said second mask comprises said second octant mask and said second byte mask.

25. The machine readable medium according to claim 24 wherein said step of comparing said first mask to said second mask includes the steps of:

performing a first NOR operation on said first octant mask and said second octant mask to output a first temporary value;

performing a second NOR operation on said first byte mask and said second byte mask to output a second temporary value;

performing an AND operation on said first temporary value and said second temporary value; and determining said first address range and said second address range are overlapping if said AND operation returns a true value.

* * * * *

UNITED STATES PATENT AND TRADEMARK OFFICE
CERTIFICATE OF CORRECTION

PATENT NO.    : 6,094,713
DATED         : July 25, 2000
INVENTOR(S)   : Khadder et al.

It is certified that error appears in the above-identified patent and that said Letters Patent is hereby corrected as shown below:

Column 1,
Line 9, delete "Modem", insert -- Modern --.

Signed and Sealed this

Seventeenth Day of December, 2002

JAMES E. ROGAN
*Director of the United States Patent and Trademark Office*